Figure 1:
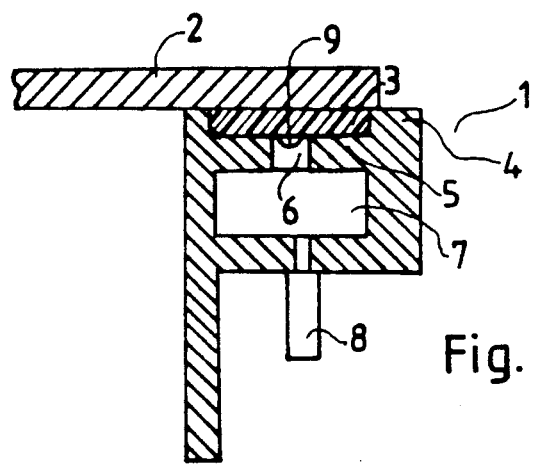

United States Patent [19]

Fastner

[11] Patent Number: 5,036,970
[45] Date of Patent: Aug. 6, 1991

[54] APPARATUS FOR GUIDING AND SUPPORTING A BOARD BLANK

[75] Inventor: Josef Fastner, Obergünzburg, Fed. Rep. of Germany

[73] Assignee: Unilever Patent Holdings B.V., Netherlands

[21] Appl. No.: 451,798

[22] Filed: Dec. 18, 1989

[30] Foreign Application Priority Data

Dec. 22, 1988 [DE] Fed. Rep. of Germany ....... 3843213

[51] Int. Cl.$^5$ ............................................. B65G 15/60
[52] U.S. Cl. ................................................. 198/811
[58] Field of Search ......................................... 198/811

[56] References Cited

U.S. PATENT DOCUMENTS 4,673,514  6/1987  Casey et al. ......................... 198/811

FOREIGN PATENT DOCUMENTS

| 653068 | 12/1969 | Belgium | 198/811 |
| 335439 | 10/1989 | European Pat. Off. | 198/811 |
| 3527763 | 2/1987 | Fed. Rep. of Germany | 198/811 |
| 1364563 | 1/1988 | U.S.S.R. | 198/811 |

Primary Examiner—Robert P. Olszewski
Assistant Examiner—Cheryl L. Gastineau
Attorney, Agent, or Firm—Cushman, Darby & Cushman

[57] ABSTRACT

Apparatus for guiding and supporting a blank made from board or a similar material which in particular has a sealable plastic surface, with a conveyor belt, that is located in a U-shaped section in the side of which facing the conveyor belt openings are provided to allow compressed air to pass through, being provided to guide the blank.

1 Claim, 1 Drawing Sheet

APPARATUS FOR GUIDING AND SUPPORTING A BOARD BLANK

DESCRIPTION

The invention relates to an apparatus for guiding and supporting a blank made from board or a similar material which in particular has a sealable plastic surface.

In apparatuses of this kind disclosed in the past, the blanks are guided between belts, which in turn rest on rollers that are located close to each other, run very easily and support the blanks effectively. When the plastic surface of coated material is heated up so that the plastic is soft, some of the plastic and the board dust that is also produced by abrasion is deposited on and contaminates the rollers. This is only a minor problem initially, but the amounts of board dust and possible deposits of plastic increase gradually and finally block the rollers completely, so that they cannot turn any more.

The purpose of the invention is to design an apparatus of the kind outlined above in such a way that this blocking of the rollers and consequent stoppages of the apparatus as well as excessive belt wear are avoided.

In the solution to this problem proposed by the invention, a conveyer belt, that is located in a U-shaped section in the side of which facing the conveyor belt openings are provided to allow compressed air to pass through, is provided to guide the blank.

When the conveyer belt is located in this way, it is not possible for the bearings to be blocked. The compressed air that is blown in also makes sure that the conveyer belt runs with very little friction, so that wear and tear is avoided to a large extent.

It is advantageous if in accordance with the invention the openings provided to allow compressed air to pass through and the running surfaces are designed in such a way that a load-bearing air cushion is created.

It is very advantageous here if in accordance with the invention the openings provided to allow compressed air to pass through are designed as holes that extend along a central line.

This leads to the creation of a very even air cushion, which together with the continous lateral guides guarantees exact movement of the belt and thus optimum transport of the blanks.

In an advantageous further development of the invention, the holes are connected by a groove that penetrates the top side at least to some extent.

Slight differences in the amount of air flowing out of the individual holes can be evened out in this way, so that a very uniform air cushion is maintained over the whole length of the apparatus.

One embodiment of the invention is illustrated in the drawing.

Figure 2:
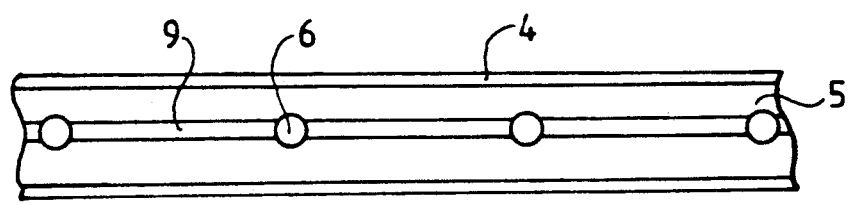

FIG. 1 is a cross-section through an apparatus for guiding and supporting a board blank and FIG. 2 is a top view of the apparatus.

1 in FIG. 1 is an apparatus which is provided to guide and support a board blank 2. In the embodiment described here, the board blank 2 is provided with a sealable plastic surface which is heated up, i.e. melted, for sealing purposes in the production of a container. The board blank 2 rests on a conveyer belt 3 that is located in a U-shaped section 4. In the side 5 of this section 4 facing the conveyer belt 3 openings 6 are provided for compressed air to be blown through under the conveyer belt, so that a layer is formed on which the conveyer belt 3 is moved. The side of the section 4 provided with the openings for compressed air forms part of a flow channel 7, the bottom of which is equipped with air supply connections 8, to which compressed air supply lines (not illustrated here) are connected.

As can be seen in FIG. 2, the openings 6 are designed as holes which extend along a central line in side 5. These holes are connected by a groove 9 which is formed from the surface of side 5 but only penetrates the material to a limited extent.

The openings 6 and the groove 9 make sure that the compressed air is distributed very evenly, so that the conveyer belt 3 can also be guided very evenly.

An appropriate device engages the upper side of the board blank 2, so that smooth transport and exact guidance are guaranteed.

I claim:

1. An apparatus for guiding and supporting a blank having a sealable plastic surface, comprising:
   a conveyor belt having a longitudinal axis and first and second longitudinal side edges;
   means for guiding and supporting said conveyor belt along at least a portion of the length thereof, including a U-shaped section for receiving said conveyor belt along at least a portion of the length thereof, said U-shaped section having a bottom wall, first and second side walls, a plurality of apertures for compressed air defined through said bottom wall, and a groove defined in said bottom wall and interconnecting said plurality of apertures.

* * * * *